(12) United States Patent
Docter et al.

(10) Patent No.: US 6,719,041 B2
(45) Date of Patent: Apr. 13, 2004

(54) HEAT EXCHANGER SYSTEM

(75) Inventors: Andreas Docter, Esslingen (DE); Norbert Wiesheu, Guenzburg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/274,089

(22) Filed: Oct. 18, 2002

(65) Prior Publication Data

US 2003/0075310 A1 Apr. 24, 2003

(30) Foreign Application Priority Data

Oct. 19, 2001 (DE) .......................... 101 51 787

(51) Int. Cl.$^7$ ................................. F28F 9/22
(52) U.S. Cl. .................. 165/159; 165/161; 422/198
(58) Field of Search ................ 165/159, 162; 422/200–205

(56) References Cited

U.S. PATENT DOCUMENTS

| | | | | |
|---|---|---|---|---|
| 1,839,738 A | * | 1/1932 | Casale | 422/199 |
| 2,491,618 A | * | 12/1949 | Luetzelschwab | 422/201 |
| 2,937,079 A | * | 5/1960 | Pool | 422/201 |
| 3,955,941 A | | 5/1976 | Houseman et al. | 48/95 |
| 4,113,441 A | * | 9/1978 | Suzuki et al. | 422/197 |
| 4,820,314 A | * | 4/1989 | Cohen et al. | 48/94 |
| 5,219,535 A | * | 6/1993 | Giacobbe et al. | 422/201 |
| 5,326,537 A | | 7/1994 | Cleary | 422/173 |
| 5,470,360 A | * | 11/1995 | Sederquist | 48/94 |
| 5,638,898 A | * | 6/1997 | Gu | 222/105 |
| 6,426,054 B1 | * | 7/2002 | Filippi et al. | 422/201 |

FOREIGN PATENT DOCUMENTS

| | | |
|---|---|---|
| DE | 8109730 | 11/1981 |
| DE | 19601579 | 8/1996 |
| DE | 19650086 | 3/1998 |
| DE | 19727841 | 1/1999 |

* cited by examiner

Primary Examiner—Terrell Mckinnon
(74) Attorney, Agent, or Firm—Davidson, Davidson & Kappel, LLC

(57) ABSTRACT

A heat exchanger system for a device for autothermal reforming of a hydrocarbon having a reaction zone fed with at least two fluids which react with one another, the reaction zone being at a higher temperature level than an environment of the device and at least one of the fluids being heated by the reaction products effluent from the reaction zone. The heat exchanger system includes tubes for transporting the effluent reaction products, at least one section of the tubes being arranged essentially parallel to a center axis of the reaction zone and led through the flow path of the fluid to be heated. At least sections of the flow path are curved helically or spirally around the center axis so that the fluid to be heated impinges on and passes around the tubes containing the effluent reaction products essentially perpendicularly. The flow path of the fluid to be heated is laid out with respect to the center axis of the tube arrangement in such a manner that the fluid to be heated is conveyed from outside to inside and/or from inside to outside at least once.

7 Claims, 2 Drawing Sheets

E-E

HEAT EXCHANGER SYSTEM

CROSS-REFERENCE TO RELATED APPLICATIONS

This application claims priority to German Patent Application No. 101 51 787.4-16, filed Oct. 19, 2001, which is incorporated by reference herein.

BACKGROUND

The present invention relates to a heat exchanger system for a device for autothermal reforming of a hydrocarbon featuring a reaction zone, which is fed with at least two fluids which react with one another. The reaction zone is at a higher temperature level than the environment of the device, and at least one of the fluids is heated by the reaction products effluent from the reaction zone. The heat exchanger system includes tubes for the effluent reaction products. These tubes are arranged essentially parallel to a common center axis at least in one tube section and led through the flow path of the fluid to be heated.

Heat exchanger systems of this kind are employed in systems that are used to produce a hydrogen-rich gas from liquid hydrocarbons. The catalytic conversion of liquid hydrocarbons to a hydrogen-rich gas, the so-called "reformate gas", is carried out in several successive steps, the actual reforming and a subsequent staged shift reaction. During reformation, the hydrocarbons are broken down into $H_2$, CO and $CO_2$ in accordance with the thermodynamic equilibrium. During the subsequent shift reaction, CO and $H_2O$ are catalytically converted to $CO_2$ and $H_2$.

The individual reactions of such autothermal reforming take place at different temperature levels which, moreover, are matched to the catalysts used in each case. Thus, the actual reforming takes place at about 800–900° C., a high-temperature shift at about 400° C., and a low-temperature shift at about 200° C. To achieve as high a system efficiency as possible, the heat of the reformats gas is coupled back into the system and used via a heat exchanger system for preheating the educts required for the autothermal reforming.

A heat exchanger system of that kind which is designed as a counter-current heat exchanger is known from German Published Patent Application No. 197 27 84 1. Here, the heat exchanger is essentially composed of individual shells which are formed of tubes that are arranged concentrically around the reaction zone. Air, oxygen, water vapor and, possibly, water are fed into the reaction chamber from outside to inside via individual annular gaps between the shells while the reformate gas is conveyed from inside to outside via adjoining annular gaps in counter-current while exchanging heat. In this manner, heat losses toward the outside are minimized. In this heat exchanger system, the energy transfer is essentially based on thermal radiation. Because of the flow cross-sections, only low flow velocities and, consequently, poor heat transfer are achieved so that energy transfer by convection has hardly any effect here.

U.S. Pat. No. 3,955,941 describes a different heat exchanger system, which takes advantage of the fact that the heat transfer is very efficient at a tube onto which the flow impinges transversely. Here, the heat exchanger system is a so-called "shell-and-tube heat exchanger" in which the reformate gas is removed from the reaction zone via tubes which are arranged parallel to one another. The air required for the reforming passes between the tubes into reaction zone and is thereby heated. To this end, the air stream is directed to the tubes as perpendicularly as possible using baffles. This always involves a loss of pressure, which is more or less strong, depending on the design of the baffles. In practice, the Boudouard reaction, in which CO is converted to $CO_2$ and elemental carbon can occur during the cooling of the reformate gas. This reaction is temperature-dependent and is described as follows:

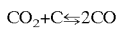

$$CO_2 + C \rightleftharpoons 2CO$$

The elemental carbon deposits as soot and can then no longer be used for the production of $H_2$. This not only reduces the system efficiency but also results in unwanted contamination of the device. The probability of occurrence of the Boudouard reaction increases with the dwell time of the flowing gas in the heat exchanger and with increasing temperature. Thus, care must be taken that the reformate gas does not cool too slowly after the reforming step.

From the further related art, there are known heat exchanger systems which, however, were designed for other purposes of use. Thus, German Patent Application DE 196 01 579 A1 and German Patent DE 196 50 086 C1 show systems for exchanging thermal energy between large gas/vapor flows and small liquid flows. In this context, the gas/vapor phase flows in concentrically arranged annular channels, which are equipped with axial, liquid-carrying tubes.

German Utility Model Patent DE 81 09 730 U1, which also belongs to the general prior art and, at its heart, is related to the filtering of oil, describes a heat exchanger in which the oil is led spirally around cooling tubes by means of baffles.

SUMMARY OF THE INVENTION

The heat exchanger system proposed by the present invention allows efficient exchange of heat and, consequently, efficient cooling of the effluent reaction products as, for example, of the reformate gas, combined with a short dwell time of the reaction products in the heat exchanger system. To this end, at least sections of the flow path of the fluid to be heated are curved helically or spirally around the center axis of the tube arrangement so that the fluid to be heated impinges on and passes around the tubes containing the effluent reaction products essentially perpendicularly.

The present invention provides a heat exchanger system for a device for autothermal reforming of hydrocarbons featuring a reaction zone, which is fed with at least two fluids which react with one another, the reaction zone being at a higher temperature level than the environment of the device, and at least one of the fluids being heated by the reaction products effluent from the reaction zone. The heat exchanger includes tubes for the effluent reaction products, the tubes being arranged essentially parallel to a common center axis at least in one tube section and led through the flow path of the fluid to be heated. At least sections of the flow path are curved helically or spirally around the center axis of the tube arrangement so that the fluid to be heated impinges on and passes around the tubes containing the effluent reaction products essentially perpendicularly. The flow path of the fluid to be heated is laid out with respect to the center axis of the tube arrangement in such a manner that the fluid to be heated is conveyed from outside to inside and/or from inside to outside at least once.

The efficient cooling of the reaction products is attributable to the fact that all heat transfer mechanisms available here for the transfer of heat, namely radiation, convection and heat conduction are made use of through the structural measures according to the present invention. Thus, for example, the heat exchanger system according to the present invention allows direct transfer of radiant heat from the effluent reaction products to the fluid to be heated. Therefore, it is also possible to use tubes having a relatively small flow cross-section for the effluent reaction products, resulting in a correspondingly high flow velocity and, consequently, in a short dwell time of the reaction products in the heat exchanger system. Since in this case, the pressure load on the hot-gas side is also relatively low, it is possible to use more cost-effective (i.e. cheaper) materials for the implementation of the heat exchanger system according to the present invention. Finally, a further advantage to be mentioned is that the heat exchanger system according to the present invention can be implemented in a very compact form of construction.

In the heat exchanger system according to the present invention, which features a particularly compact design and a good exchange of heat, the flow path of the fluid to be heated is laid out with respect to the center axis of the tube arrangement in such a manner that the fluid to be heated is conveyed from outside to inside and/or from inside to outside at least once. In the case of a helically curved flow path, the fluid can, for example, be initially led helically upward around the tubes in the outer region of the tube arrangement and then be led helically downward around the tubes in the inner region of the tube arrangement and fed into the reaction zone. In the case of a spirally curved flow path, the fluid can, for example, be led spirally around the tubes from outside to inside at the upper end of the tube arrangement and then be led back from inside to outside at a lower level of the tube arrangement and so on until the fluid reaches the bottom end of the tube arrangement and is fed into the reaction zone.

In an advantageous variant of the heat exchanger system according to the present invention, the flow cross-section is essentially constant in the entire flow path of the fluid to be heated. In this case, the heat transfer between the effluent reaction products and the fluid to be heated is particularly efficient.

To allow as good a flow impingement as possible on the tubes for the effluent reaction products and, consequently, to achieve as good a heat transfer as possible to the fluid to be heated, it turns out to be advantageous for the tubes to be arranged in a staggered manner in the flow path of the fluid to be heated.

In principle, there are different possibilities for the structural implementation of the heat exchanger system according to the present invention. If the tube arrangement is arranged in a housing, a shell-type design turns out to be advantageous in which the flow path for the fluid to be heated is bounded by at least one partition wall in the housing that is oriented essentially parallel to the center axis of the tube arrangement and is curved around the center axis. The partition walls for a helically curved flow path can simply be formed of tubes of different diameters that are arranged concentrically around the center axis. Moreover, the flow path for the fluid to be heated is additionally bounded by partition plates, which are helically designed and arranged between the partition walls. The partition wall for a spirally curved flow path is curved spirally around the center axis. Moreover, the flow path for the fluid to be heated is additionally bounded by the partition plates, which are oriented essentially perpendicularly to the center axis of the tube arrangement.

BRIEF DESCRIPTION OF THE DRAWINGS

As discussed in detail above, the teaching of the present invention can be advantageously embodied and refined in different ways. In this regard, reference is made to the claims and to the following description of two exemplary embodiments of the present invention with reference to the drawings, in which:

DETAILED DESCRIPTION

The heat exchanger systems, which are described in the following by way of example, are each shown in conjunction with a device for autothermal reforming of liquid hydrocarbons. At this point, however, it should be explicitly noted that the heat exchanger system according to the present invention can, in principle, be used in conjunction with all devices that include a reaction zone which is fed with at least two fluids which react with one another provided that the reaction zone is at a higher temperature level than the environment of the device, and at least one of the fluids is intended to be heated by the reaction products effluent from the reaction zone. It is understood that the heat exchanger system shown is a heat exchanger which is used to selectively change the state of fluids, such as cooling and heating, and which consequently allows processes to become more economic by using waste heat.

Figure 1:
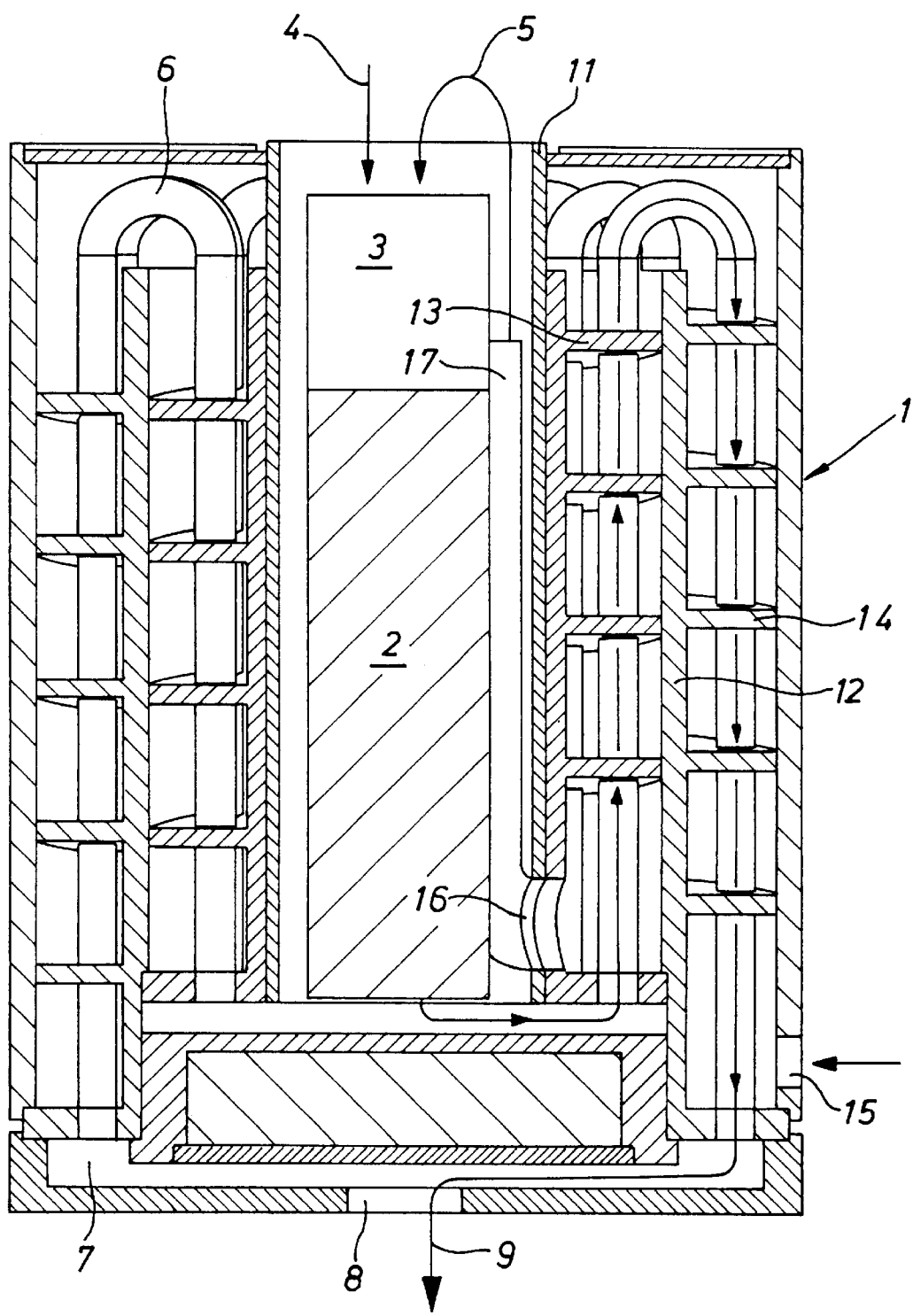
FIG. 1 is a longitudinal section through a first heat exchanger system according to the present invention.

In the variant shown in FIG. 1, reaction zone 2 is centrically arranged in a housing 1. In reaction zone 2, there is a temperature of about 800° C. At the upper end of reaction zone 2, there is arranged a mixture preparation zone 3 via which reaction zone 2 is fed with hydrocarbons 4 to be converted and with an air/water vapor mixture 5. At the bottom end of reaction zone 2, the reformate gas exists at a temperature of about 800° C. and is carried off through a plurality of tubes 6 connected in parallel. Tubes 6 are arranged around reaction zone 2 in an axially symmetric manner relative thereto. Each of tubes 6 is run from the bottom end of reaction zone 2 to the upper end of reaction zone 2 and then back again. To this end, tubes 6 are bent radially outward by 180° at the upper end of reaction zone 2 so that each tube 6 includes two sections which are essentially parallel to reaction zone 2, namely an inner section and an outer section. At the bottom end of reaction zone 2, tubes 6 finally open out into a common annular channel 7. This annular channel is connected to an outlet port 8 of housing 1 from which the cooled reformate gas exits. The flow direction of the reformate gas is represented here by arrow 9.

Tubes 6 are run through the flow path of the fluid to be heated, here of air/water vapor mixture 5. According to the present invention, in the exemplary embodiment shown here, the flow path is helically curved around the center axis of the tube arrangement for that purpose so that air/water vapor mixture 5 impinges on and passes around tubes 6 containing the effluent reformate gas essentially perpendicularly.

Here, the flow path for air/water vapor mixture 5 is defined, on one hand, by two partition walls 11 and 12 and, on the other hand, by partition plates 13 and 14. Used as partition walls are two tubes 11 and 12 of different diameter which are arranged concentrically relative to the center axis of reaction zone 2 and, consequently, also of the tube arrangement. Thus, tube 11 is positioned between reaction zone 2 and the inner sections of tubes 6, and tube 12 is positioned between the two inner and outer sections of tubes 6 that run parallel to each other. Partition plates 13 and 14 have a helical design and are arranged between tubes 11 and 12 as well as between tube 12 and housing wall 1. Tubes 6 are run through partition plates 13 and 14.

Via an inlet port 15 in the lower region of housing wall 1, air/water vapor mixture 5 is fed into the space between housing wall 1 and tube 12 and there flows helically upward because of the inclination of partition plates 14. At the upper end of housing 1, the flow of air/water vapor mixture 5 is then conveyed into the space between tubes 11 and 12, where it is conveyed helically downward. To prevent a reversal of flow, partition plates 13 and 14 are inclined in opposite directions. Via an opening 16 in inner tube 11, air/water vapor mixture 5 is then conveyed into space 17 between inner tube 11 and reaction zone 2 where it flows upward again toward mixture preparation zone 3. Via mixture preparation zone 3, the now already preheated air/water vapor mixture 5 is fed into reaction zone 2.

Due to the relatively small flow cross-section of tubes 6, the effluent reformate gas is carried off at high flow velocity. To achieve as good a heat transfer as possible, air/water vapor mixture 5 to be heated is led helically around tubes 6 so that the flow impinges on tubes 6 virtually perpendicularly. The correspondingly high flow velocity of the air/water vapor mixture results from the clearance of the inclination of the flow path, i.e., the flow cross-section, comparable to a screw thread. In this manner, the heat exchanger system described here uses also thermal radiation in addition to convection for the transfer of heat. In this concept, thermal convection acts only on the air/water vapor mixture to be heated since the individual tubes are not in the radiation field of the respective other tubes. Moreover, the above-described variant of a heat exchanger system according to the present invention has a particularly compact design. Due to the shell concept including the two telescoped helices, it is possible to virtually halve the overall length of the heat exchanger system because the length of the heat exchange path is telescoped in this manner.

Figure 2:
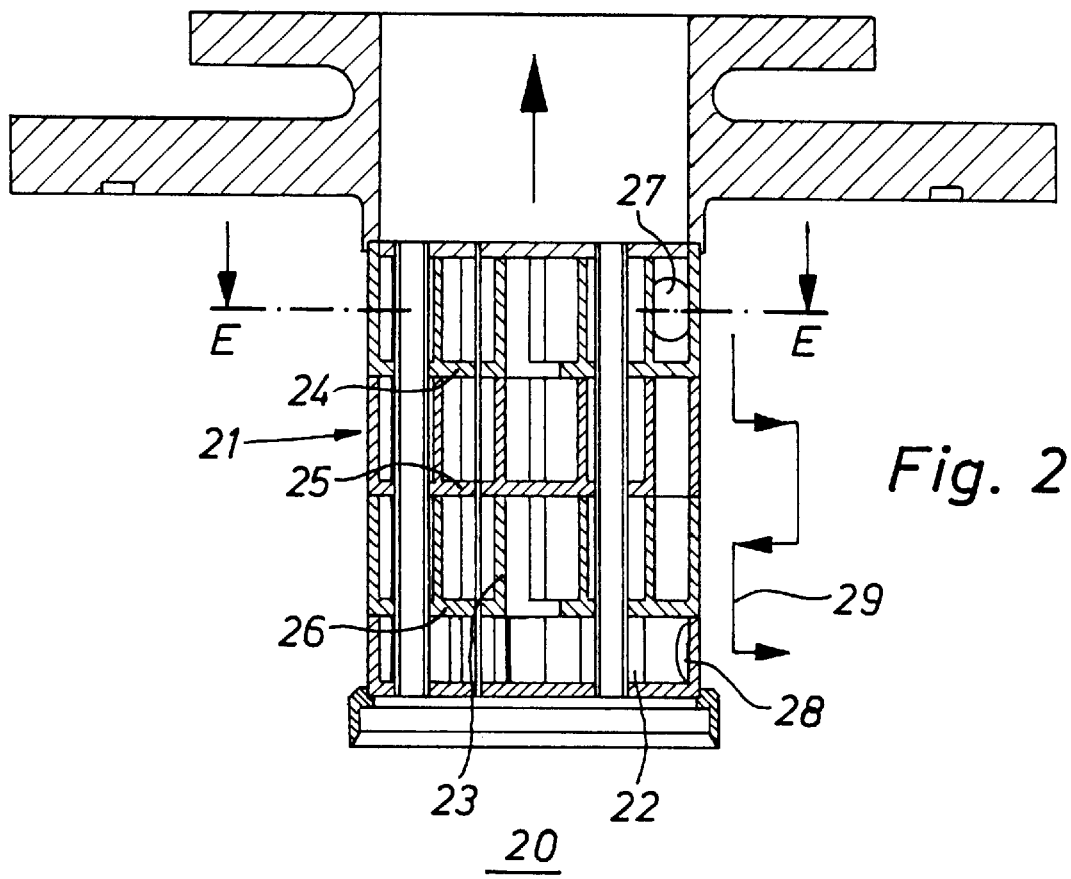
FIG. 2 shows a longitudinal section through a second heat exchanger system according to the present invention.

In the variant shown in FIG. 2, reaction zone 20 for the autothermal reforming of the hydrocarbons is positioned below the actual heat exchange system and therefore not specifically shown. The heat exchanger system is located in a separate housing part 21. The reformate gas exits reaction zone 20 at a temperature of about 800° C., which approximately corresponds to the temperature prevailing in reaction zone 20, and is carried off through a plurality of tubes 22 which are connected in parallel and arranged parallel to each other in housing part 21. The spiral arrangement of tubes 22 around a common center axis is illustrated by the cross-sectional view of FIG. 3. At the upper end of the tube arrangement, tubes 22 open out into the reaction zone for the subsequent shift reaction, which takes place at a temperature level of about 400° C. or about 200° C., respectively.

Here, as in the variant shown in FIG. 1, tubes 22 are also led through the flow path of the air/water vapor mixture to be heated. However, in the exemplary embodiment shown here, the flow path is spirally curved around the center axis of the tube arrangement for that purpose so that, here too, air/water vapor mixture 5 impinges on and passes around tubes 22 containing the effluent reformate gas essentially perpendicularly.

Figure 3:
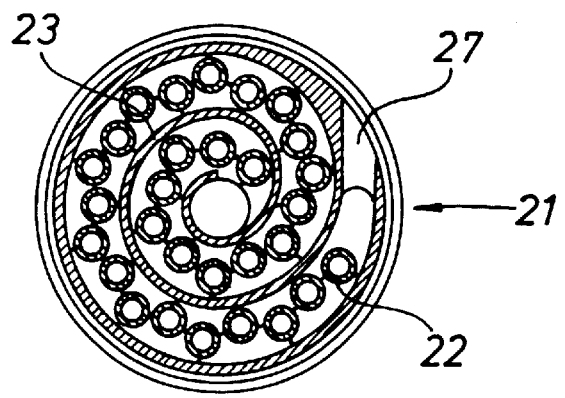
FIG. 3 shows a cross section through the heat exchanger system shown in FIG. 2 along plane of intersection E—E.

Here, the flow path for the air/water vapor mixture is defined, on one hand, by a partition wall 23, which is spirally curved around the center axis of the tube arrangement, which, again, is illustrated by FIG. 3. On the other hand, the flow path for the air/water vapor mixture is bounded by three partition plates 24, 25, and 26 which are arranged in housing part 21 essentially horizontally. Tubes 22 are run through partition plates 24 through 26.

Via an inlet port 27 in the upper region of housing part 21, the air/water vapor mixture is fed into the space between the housing wall and partition plate 24 and there flows spirally inward because of the spiral curvature of partition wall 23. In the region of the center axis of the tube arrangement, there is a first opening in partition plate 24 (not shown here), via which the air/water vapor mixture flows into the space between partition plates 24 and 25. Here, the air/water vapor mixture is conveyed spirally outward again where there is a second opening in partition plate 25 (not shown either). In this manner, the air/water vapor mixture flows into the space between partition plates 25 and 26, and there inward again in the direction of the center axis where there is a third opening in partition plate 26. Finally, the air/water vapor mixture flows outward again in the space between partition plate 26 and the housing wall, and exits from an outlet 28 in housing part 21. The air/water vapor mixture, which is heated in this manner, can now be fed into reaction zone 20 for the autothermal reforming. The above described flow path of the air/water vapor mixture is illustrated by arrow 29.

As already mentioned, the cross-sectional view of FIG. 3 illustrates the spiral curvature of partition wall 23 as well as the arrangement of tubes 22 in the flow path of the air/water vapor mixture that is defined by partition wall 23. In this connection, moreover, it should be noted that the flow cross-section is essentially constant in the entire flow path of the air/water vapor mixture, resulting in a very efficient heat transfer between tubes 22 for the effluent reformate gas and the air/water vapor mixture. In the exemplary embodiment shown here, moreover, tubes 22 for the effluent reformate gas are arranged in a staggered manner in the flow path of the air/water vapor mixture to be heated to optimize the flow impingement on tubes 22.

What is claimed is:

1. A heat exchanger system for use with a device for autothermal reforming of hydrocarbons including a reaction zone configured to be fed with at least two fluids capable of reacting with one another, the reaction zone being at a higher temperature level than an environment of the device and discharging effluent reaction products for heating at least one of the at least two fluids, the heat exchanger system comprising:

a plurality tubes for transporting the effluent reaction products, the tubes including at least one tube section disposed essentially parallel to a center axis of the reaction zone;

a flow path for the at least one fluid to be heated, sections of the flow path being curved spirally or helically around the center axis, the tubes being disposed in the flow path so that the at least one fluid impinges on and passes around the tube sections essentially perpendicularly.

2. The heat exchanger system as recited in claim 1, wherein a cross-section of the flow path is essentially constant throughout the flow path.

3. The heat exchanger system as recited in claim 1 wherein the tubes are disposed in a staggered manner relative to one another in the flow path.

4. The heat exchanger system as recited in claim 1 further comprising a housing including at least one partition wall oriented essentially parallel to the center axis and curved around the center axis, wherein the tubes are arranged in the housing and the flow path is bounded by the at least one partition.

5. The heat exchanger system as recited in claim 4 wherein the housing includes partition plates disposed between the partition walls, the flow path being bounded by the partition plates.

6. The heat exchanger system as recited in claim 5 wherein the partition plates are oriented in a helical manner relative to the center axis.

7. The heat exchanger system as recited in claim 5 wherein the partition plates are oriented essentially perpendicular to the center axis.

* * * * *